US012694237B2

(12) United States Patent
Arslan et al.

(10) Patent No.: US 12,694,237 B2
(45) Date of Patent: Jul. 28, 2026

(54) REAL-TIME AUTOMATIC ONLINE VOICE TRANSLATION SYSTEM AND METHOD FOR TELEPHONE CONVERSATIONS

(71) Applicant: Sestek Ses ve Iletisim Bilgisayar Teknolojileri San. ve Tic. A.S., Istanbul (TR)

(72) Inventors: Levent Arslan, Istanbul (TR); Bayram Boyraz, London (GB); Ali Haznedaroglu, Ankara (TR)

(73) Assignee: SESTEK SES VE ILETISIM BILGISAYAR TEKNOLOJILERI SAN. VE TIC. A.S., Istanbul (TR)

( * ) Notice: Subject to any disclaimer, the term of this patent is extended or adjusted under 35 U.S.C. 154(b) by 277 days.

(21) Appl. No.: 18/407,479

(22) Filed: Jan. 9, 2024

(65) Prior Publication Data

US 2025/0225341 A1 Jul. 10, 2025

(51) Int. Cl.

| | |
|---|---|
| G06F 40/58 | (2020.01) |
| G10L 13/02 | (2013.01) |
| G10L 15/00 | (2013.01) |
| G10L 15/22 | (2006.01) |
| G10L 15/30 | (2013.01) |
| G10L 25/78 | (2013.01) |
| H04M 3/523 | (2006.01) |

(52) U.S. Cl.
CPC .............. *G06F 40/58* (2020.01); *G10L 13/02* (2013.01); *G10L 15/005* (2013.01); *G10L 15/22* (2013.01); *G10L 15/30* (2013.01); *G10L 25/78* (2013.01); *H04M 3/523* (2013.01)

(58) Field of Classification Search
USPC .......................................................... 704/3–7
See application file for complete search history.

(56) References Cited

U.S. PATENT DOCUMENTS

| | | | | |
|---|---|---|---|---|
| 8,204,182 B2 * | 6/2012 | Da Palma | ............... | G10L 15/22 704/4 |
| 2014/0122053 A1 * | 5/2014 | Lotan | ..................... | G16H 10/60 704/270.1 |
| 2023/0096543 A1 * | 3/2023 | Moy | ..................... | H04M 3/563 704/3 |

* cited by examiner

*Primary Examiner* — Leonard Saint-Cyr
(74) *Attorney, Agent, or Firm* — Bayramoglu Law Offices LLC

(57) ABSTRACT

An automatic online voice translation system and method, comprising a virtual translator, a SIP gateway, and a storage, wherein the SIP gateway receives a call from a caller, when the virtual translator is not activated, the SIP gateway establishes a communication between the caller and the agent by streaming in real-time caller's voice directly to the agent and agent's voice directly to the caller, and when the virtual translator is activated, the SIP gateway creates audio files based on the received voice streams of both the caller and the agent, and sends the created audio files to the virtual translator for translating the caller's voice into a language understood by the agent, before transmitting the voice to the agent. In another embodiment, a contact center platform is used for applying features such as call recording, Interactive Voice Response (IVR) service, and conferencing service to the call.

20 Claims, 4 Drawing Sheets

REAL-TIME AUTOMATIC ONLINE VOICE TRANSLATION SYSTEM AND METHOD FOR TELEPHONE CONVERSATIONS

TECHNICAL FIELD

The present disclosure relates to the real-time voice translation technical field, and in particular, relates to a real-time automatic online voice translation system and method that translates telephone conversations between a caller and an agent.

BACKGROUND

Nowadays companies across various industries, including finance, utilities, and caller services, are providing their services to callers through remote interactions. In order to deliver enhanced and efficient services to the callers, smarter and advanced solutions are required to reach instant and to-the-point support.

In an era where caller services come to the forefront, communication and multilingual support becomes considerably vital. According to Salesforce Research, 93% of callers are likely to sustain repeat purchases with companies that offer excellent caller services. Therefore, contact centers that support multilingual communication are crucial, especially in industries like finance, insurance, health care, and e-commerce, callers/users speaking in a different language may crave for an instant responsive solution in an emergency. In these emergency situations, instant and to-the-point comprehensible solutions may have a huge impact on life and dead. However, not every caller contact point employs an interpreter and/or multiple interpreters for each possible language that might be needed, and not all language translation requirements in a global society may be addressed by human language translators.

A speech-to-speech translation is a solution created to overcome language barriers during real time communication. At current state of the art, a speech-to-speech translation refers to a translation from one single spoken language into another within different scenarios such as video translation, international conference communication, and language translation in real time calls. The current state of the art computer system determines the caller's language and transfers the caller to a live interpreter. Another common solution converts spoken expressions into data and examines the data to recognize specific information, which results as textual context for further speech synthesis to identify a particular language of the oral statement.

There are different domain-specific voice-to-voice translation systems. For example, IBM's MASTER PC based system is being used in laptop PCs by U.S. Armed Forces for the War in Iraq. The system obtains high accuracy results being used in interactive communication with Arabic speaking Iraqis. The examples may be multiplied for various domains and channels. Forefront channels to be further developed and widely applied to telephony, including wireline, mobile, internet based VOIP, or any combination thereof.

Due to developments in Speech Recognition, Statistical Machine Translation, and Voice Synthesis, the realization of automated Multi-Lingual Voice-to-Voice translation is now achievable. However, none of the methods comprise an IVR system to be a bridge between a caller and a responder to enable real-time communication for speakers of different languages. A primary issue with current systems is the lack of control call center agents have over translation services when virtual translators join conversations as third parties. This often leads to interruptions or delays in the conversation, which can be frustrating for callers and inefficient for agents. Traditional setups involving third-party translators often lead to increased call times and potential misunderstandings due to the added layer of interaction. To employ an IVR system IVR system in machine translation systems would bring operational convenience with an accelerated service.

Another problem in existing setups is the loss of crucial conversation context or information that occurs when the initial part of the conversation, prior to the translator joining, is not translated. This can be especially problematic if callers have already provided important details.

Furthermore, in existing technology of virtual translators, the emotional nuances in a caller's voice can be lost in translation. This is particularly true when agents only hear the synthesized voice and not the original tone of the caller, which can impede the agent's ability to fully understand and empathize with the caller's situation.

The current state of the art in real-time language translation primarily revolves around two methods. The first method involves determining the caller's language and subsequently transferring the call to a live interpreter. The second method converts spoken expressions into data, which is then analyzed to recognize specific information. This information forms a textual context that is used for further speech synthesis, aiding in the identification of the language of the oral statement.

The aforementioned methods do not meet the needs as to-the-point responses are vital to get the caller to the desired destination with prompt action. to assist callers in emergencies. Time delays in emergencies in call centers due to translation can significantly impact response times and the handling of urgent situations. These delays occur when information needs to be translated prior to proper meaning extraction and acted upon by call center agents. This can lead to inefficient communication and timely assistance interception affecting the outcomes of emergency situations.

Alternative approaches to real-time language translation can vary in their methodology and technology. One such alternative is the direct use of multilingual agents, where call centers employ agents fluent in multiple languages. This approach eliminates the need for translation technology but requires a diverse and linguistically skilled workforce.

Another alternative is the implementation of pre-recorded responses in multiple languages. In this system, commonly asked questions or statements are recorded in various languages and played back based on the identified language of the caller. While this method can be efficient for routine inquiries, it lacks the flexibility to handle complex or unique caller interactions.

Therefore, there is an urgent need for a real-time seamless speech-to-speech translation experience during phone calls in call centers.

SUMMARY

The purpose of this invention is to revolutionize real-time translation within Interactive Voice Response (IVR) systems for call centers, fostering seamless communication between callers and agents who speak different languages. At the core of this system is a sophisticated "virtual translator" that is adept at recognizing spoken languages, converting speech to text, translating the text into the desired language, and then converting this translated text back into speech. This end-to-end process is fully integrated within the IVR system to provide a seamless speech-to-speech translation experience during phone calls in call centers.

The invention's technical activities include enhancing speech recognition capabilities through Machine Learning (ML) models and exploring the potential of multilingual models. The invention also aims to advance speech synthesis by utilizing Generative models and evaluating existing research in the field. The system is designed to detect the input language, allowing time for the agent to decide whether to request translation. Integration ensures compatibility with various platforms and phone systems, with a focus on real-time translation and minimizing delays. The invention's innovation lies in implementing speech-to-speech translation within IVR, addressing the challenge of real-time translation, and integrating this technology with existing IVR infrastructure.

It is crucial to highlight that most of the calls received in the call centers are responded to by agents and solved properly without a need for a virtual translator since the majority of the calls are in the related country's own language. When a call is received in a different language in an emergency context a translator with relevant language expertise might not be present in the call center and in fact it should not be the case in a world surrounded by digital opportunities. One of the pain points, in fact a vital one, in virtual translation is the providing the solution as fast and accurately as possible. Even seconds matter while trying to connect to virtual translator in case of emergency, even small latencies matter. In a scenario where a caller presses a button and/or dial an extension contributes to these delays, at the same time making the process more complicated.

Here the topic truly shines by activating a virtual translator by agents once it's understood that the caller is speaking a foreign language. The virtual translator starts translation right after agent activates the translation mode by either clicking a button or dialing extension. Usually, the person who calls the call center presses a button or dial an extension to reach the related language translator. Once the related button is pressed for translation agent does not hears the caller anymore. At the meantime on agent's screen a real time translation is flowing to easily followed for instant support, if desired the translation also can be listened as audio. The agent does not start speaking until the caller finishes talking. Through VAD (voice activity detection) feature, the agent follows the caller's speaking which ensures if the caller is still in speaking mode and a synchronized communication enabling prompt responses.

By directly rooting the translator to the IVR system, without any attempt to understand which language is spoken, the invention sheds light on a major problem for emergency calls. Thereby the invention encompasses so to say "open wound" of the emergency calls the delayed responses, in emergency even second's matter. Moreover, eliminates the dependency on resources, less agent can be hired with different language skills, the virtual translator takes the stage to detect the language spoken by caller rather than expecting an agent to understand it.

This invention introduces three key solutions to problems identified in the above section. Firstly, call center agents have the ability to enable the virtual translator through a simple button press, placing complete control of the translation process in their hands. This feature ensures that agents can activate the translation as needed, based on the flow of the conversation. Secondly, the system is designed to store parts of the conversation spoken by the caller prior to the activation of the virtual translator. This ensures that no part of the dialogue is missed and can be translated once the feature is activated, maintaining the continuity and context of the conversation. Thirdly, the invention incorporates a sentiment analysis feature, which enables agents to view the emotional state of the caller. This is particularly crucial as it allows the agent to understand the sentiment behind the caller's words, a nuance that might be lost in the text-to-speech process of the virtual translator, as the agent has the control over what to hear-hear only the caller, hear both TTS and the caller, or hear only TTS—and it might not directly hear the caller's voice. The agent's control over TTS voice/caller's original voice is especially important since the agent might be visually impaired or using the screen for something else, so that the agent could adjust the call to be both contain caller's original voice and the translated TTS voice.

This invention marks a significant advancement in the field of telecommunications and caller service. By enabling call centers to offer multilingual support, it enhances caller satisfaction and loyalty through efficient communication in the caller's native language. It achieves it by serving as a real-time translator between the caller and the agent. Furthermore, the technology aids in serving a diverse international caller base, facilitating global market expansion and strengthening caller relations. The invention's ability to facilitate real-time communication, along with its storage and sentiment analysis features, substantially reduces the need for language-specific personnel and training, thereby saving time and resources. Moreover, it helps call centers meet regulatory requirements and ensures effective communication in emergency situations, ultimately revolutionizing call center operations to be more caller-centric, efficient, and globally accessible.

DETAILED DESCRIPTION OF THE EMBODIMENTS

Figure 1:
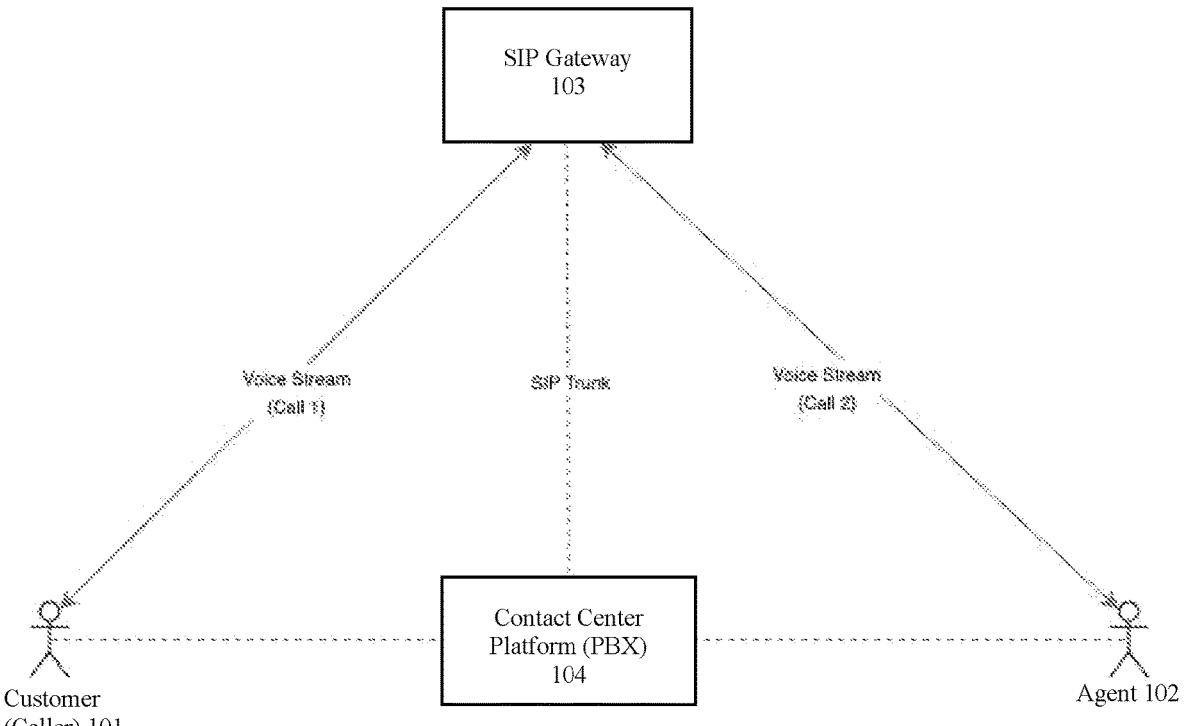
FIG. 1 illustrates a topology of the automatic online voice translation system in a first embodiment of the present disclosure that both the caller's voice and the agent's voice stream directly into a Session Initiation Protocol (SIP) Gateway, without activation of the virtual translator.

In this respect, before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

In the present disclosure a "caller" is a person who makes a phone call or initiates communication through a phone call or other means to reach a respondent in the call center for her/his emergency. An "agent" is a call services representative or a person who acts on behalf of business to assist callers or perform certain tasks.

The operation, function, and use of the disclosed real-time voice translation system for contact centers involves a series of sophisticated technological interactions. It is essential to take into consideration different languages that might be entered during an emergency call to guide as quickly as possible without language burdens. Multilingual real-time virtual translation solutions should be designed in a way that leverages instant solutions in the target language without the need for third-party. Within the scope of the solution, an IVR-based real-time speech-to-speech translation is described for seamless interaction to be the "instant emergency solution" for callers. The Real Time virtual translator is a state-of-the-art system designed to facilitate real-time language translation within the dynamic environment of contact centers. Integrating seamlessly with a contact center's existing telephony and IT infrastructure, typically through a Private Branch Exchange (PBX) system, the system is initiated when a caller's call is routed via a SIP Trunk connection.

The process begins with the SIP Gateway, which serves as a pivotal bridge between the Contact Center Platform and the virtual translator, enabling the streaming of voice data. This gateway is instrumental in allowing direct communication between the agent and the caller before the activation of the virtual translator. It streams the caller's voice directly to the agent and vice versa, fostering immediate interaction if the agent understands the caller's language.

The architecture of the system provides flexibility in how the user's voice is streamed. In one configuration, the voice stream passes through the PBX to the SIP Gateway, leveraging PBX features like call recording and conferencing for added functionality. Alternatively, the voice can be streamed directly to the SIP Gateway, reducing latency and simplifying the system's structure for efficiency.

A crucial feature of the system is the continuous collection of the user's voice by the SIP Gateway. This ensures that no part of the conversation is missed, even if the virtual translator is activated mid-conversation. When translation is needed, the agent can activate the virtual translator by clicking a button or dialing a pre-determined number combination, triggering the translation process.

The system uses real-time connections, such as WebSocket or a cross-platform open source high performance remote procedure call (gRPC), for bidirectional communication between the SIP Gateway and the Orchestration Service. The SIP Gateway creates and sends audio files to the virtual translator. Concurrently, a Voice Activity Detection (VAD) component works to recognize when a person is speaking, processing only necessary audio and providing visual indicators to the agent when the caller is speaking, to avoid interruptions.

Upon receiving the voice stream, the virtual translator employs Speech Recognition (SR) technology to transcribe spoken words into text in real time. The SR service's Language Identifier module then identifies the caller's spoken language. This transcribed text, along with the detected language and the agent's target language, are fed into the Translation module. Utilizing Machine Learning, this module performs real-time, multi-lingual translation, converting the text into the agent's language.

An innovative addition to this process is the optional use of voice cloning technology in the Text-to-Speech (TTS) engine. This technology enhances human-like experience and facilitates the detection of emotional nuances in speech. The translated text is synthesized into audible speech and, along with emotional tones and sentiments from the caller's speech, is displayed on the agent's screen by the Orchestrator service. The agent controls the volume output of this module streamed to the agent and it can either disable it completely (translation is done through the text displayed on the agent's screen) or adjust the volume of the caller's original voice and the TTS output according to their preference. The caller can choose to only hear the output of the TTS module or choose to hear the caller's original voice and the TTS output simultaneously.

A significant aspect of this innovation is the agent's ability to precisely control the Text-to-Speech (TTS) sound volume, offering remarkable flexibility in managing communication. This feature empowers the agent to tailor their auditory experience according to the needs of each interaction. For instances where reading the translated text is feasible, the agent can opt to listen exclusively to the caller's voice, with the translation appearing on-screen like subtitles by the Orchestrator service, enhancing comprehension without auditory interference. Alternatively, in situations where reading may be impractical or the agent prefers auditory input, they can choose to hear only the TTS voice, ensuring clear understanding of the translated dialogue. The system also accommodates scenarios that require a blend of both, allowing agents to listen simultaneously to the caller's original voice and the TTS translation. This dual-listening mode is especially beneficial in maintaining the conversational context and nuances, bridging the gap between the spoken word and its translated counterpart.

The translated speech stream is then sent back to the SIP Gateway and streamed to the agent's call. For the agent's response, the process is inverted, with the system translating and streaming the agent's speech back to the caller, thus ensuring a seamless conversation.

This invention, therefore, not only provides real-time translation but also ensures complete agent control over translation activation, preserves the entire conversation for context, and maintains the emotional integrity of the interaction. It revolutionizes call center operations by enabling effective, empathetic, and efficient communication across different languages.

FIG. 1 illustrates a topology of the automatic online voice translation system in a first embodiment of the present disclosure that both the caller's voice and the agent's voice stream directly into the SIP Gateway, without activation of the virtual translator. To be more specific, FIG. 1 shows that upon the SIP gateway 103 receives a call from the caller 101, the SIP gateway 103 enables a communication between the agent 102 and the caller 101 directly and streams the caller's voice directly to the agent 102 and agents voice directly to the caller 101. As shown in FIG. 1, the virtual translator has not been activated yet and in this embodiment the Contact Center Platform (PBX) 104 is not used, so that the communication between the caller 101 and the agent 102 has a reduced communication latency and is more efficient and cost-effective due to a simple voice streaming architecture is used.

Figure 2:
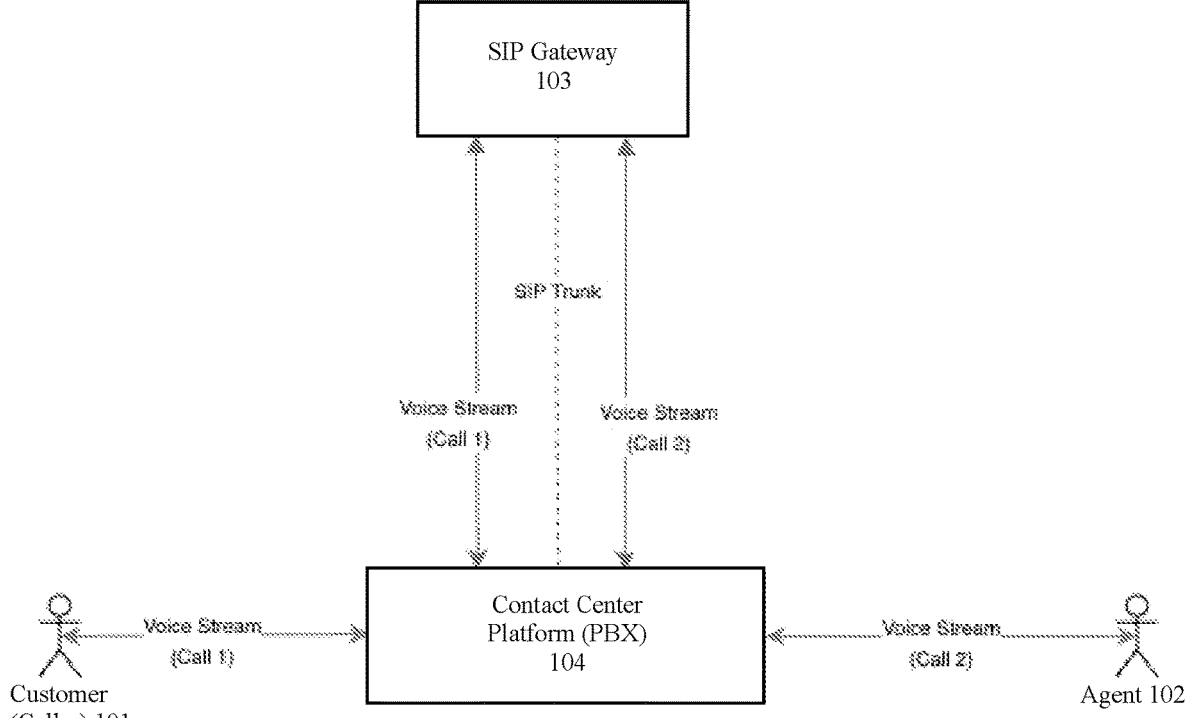
FIG. 2 illustrates a topology of the automatic online voice translation system in a second embodiment of the present disclosure that both the caller's voice and the agent's voice stream through a Private Branch Exchange (PBX), without activation of the virtual translator.

Alternatively, FIG. 2 illustrates a topology of the automatic online voice translation system in a second embodiment of the present disclosure that both the caller's voice and the agent's voice stream through the PBX, without activation of the virtual translator. Instead of a simple voice communication connection via a single SIP Gateway 103, the system utilizes a Contact Center Platform (PBX) 104 to receive the call from the caller before routing the call from the caller 101 to the SIP Gateway 103. This architecture allows more flexibility in further handling the call before connecting the calls to the agent 102. The Contact Center Platform (PBX) 104 processes the received call based on specific requirements and needs. The PBX 104 provides features including, but not limited to, call recording, Interactive Voice Response (IVR) service, and conferencing service. Processing the voice stream through the PBX first would allow these features to be applied to the call before the call reaches the SIP Gateway 103 for further connection. Similarly, the agent's voice is also first routed to the PBX 104 and is processed by the PBX 104 before being further routed to the SIP Gateway 103 for connecting with the caller's call at the SIP Gateway 103.

Figure 3:
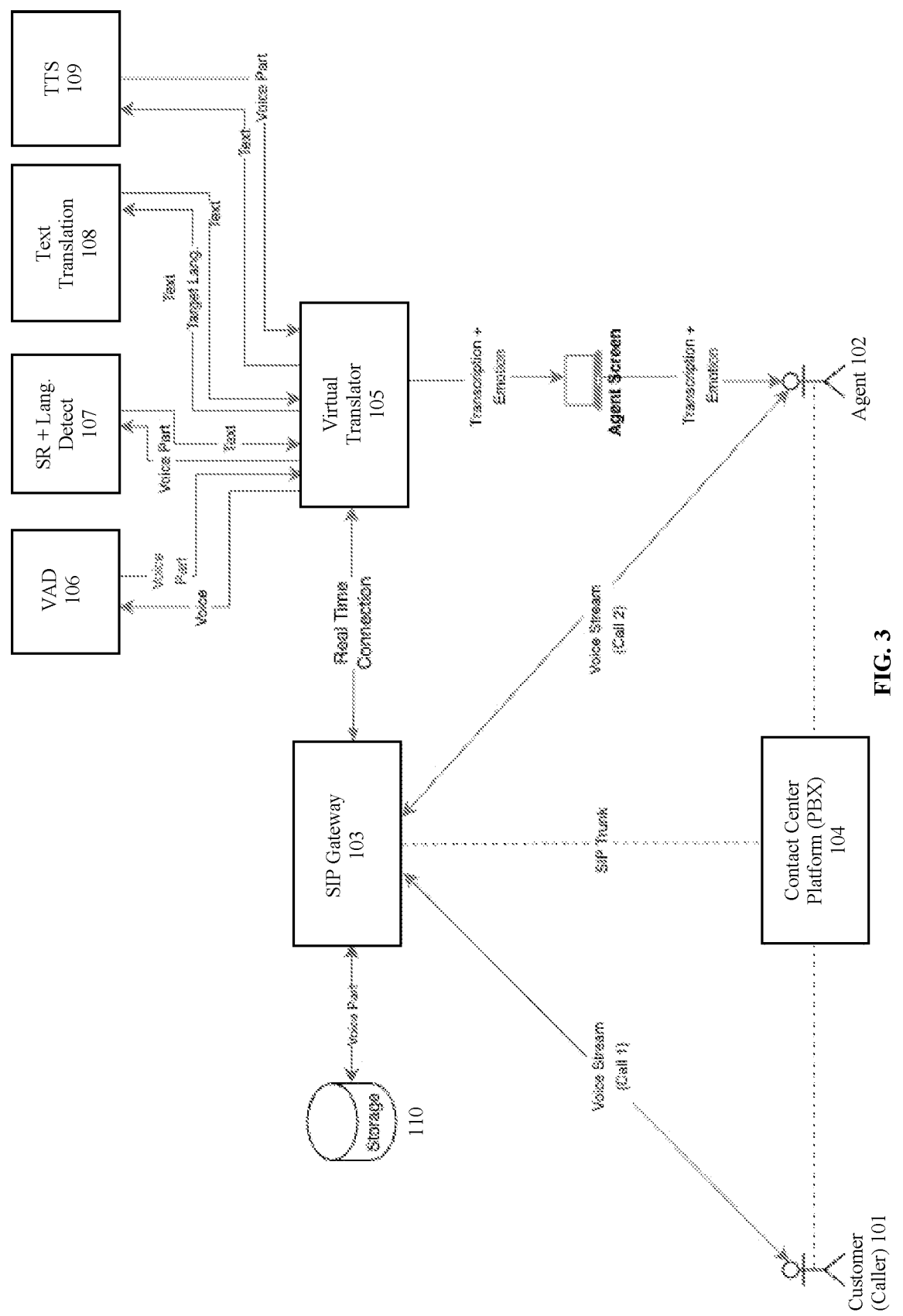
FIG. 3 illustrates a topology of the automatic online voice translation system in the first embodiment of the present disclosure that both the caller's voice and the agent's voice stream directly into the SIP Gateway, with activation of the virtual translator.
Figure 4:
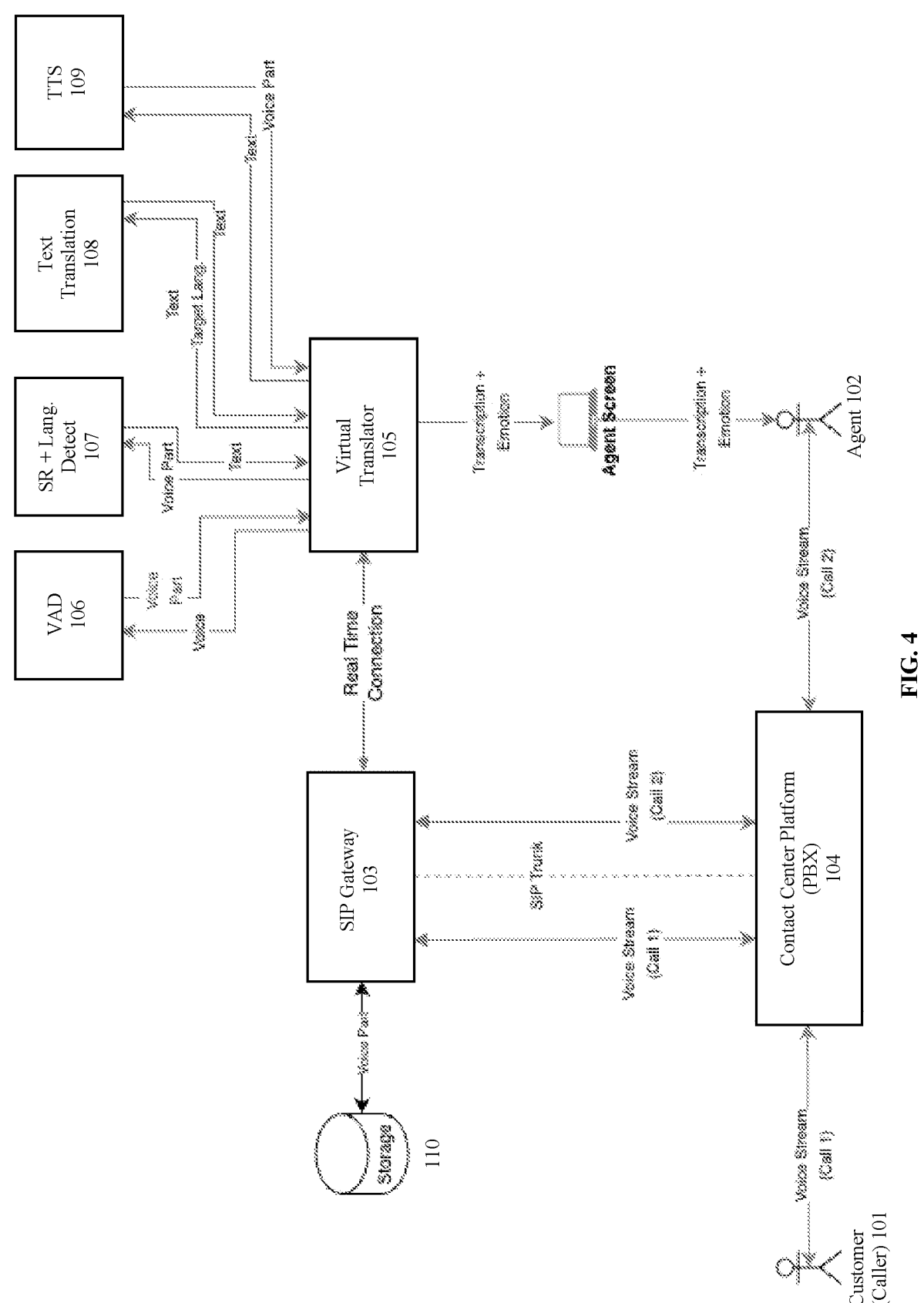
FIG. 4 illustrates a topology of the automatic online voice translation system in the second embodiment of the present disclosure that both the caller's voice and the agent's voice stream through the PBX, with activation of the virtual translator.

As shown in FIGS. 3 and 4, the SIP Gateway 103 collects the caller 101's speech and stores the caller 101's voice in the storage 110. This is done so that if the agent 102 activates the virtual translator, the initial conversation segment between the caller 101 and the agent 102 before the activation is not missed, and therefore the agent 102 does not need to ask the caller to repeat the initial segment of the conversation.

In one embodiment, as shown in FIG. 3, the SIP Gateway 103 is in direct communication with both the caller 101 and the agent 102. In another embodiment, as shown in FIG. 4, the SIP Gateway acts as a bridge between the PBX 104 and the virtual translator 105 allowing the voices of the caller 101 and voices of the agent 102 to stream. The embodiment of FIG. 4 is designed to work within a contact center's existing telephony and IT framework, typically a PBX (Private Branch Exchange) system 104, and the PBX 104 routes the communication between the caller 101 and the agent 102 to and from the SIP Gateway 103 through a SIP Trunk connection. The SIP Gateway 103 acts as a bridge between the PBX 104 and the virtual translator 105 to allow further translation of the real-time communication between the caller 101 and the agent 102.

To be more specific, if the agent can communicate with the caller in the spoken language of the caller, the caller 101 communicates with the agent 102 as described in FIGS. 1 and 2 above, and the system does not activate the virtual translator 105.

If the agent cannot communicate with the caller in the spoken language of the caller, the agent clicks a button or dials a pre-determined number of combinations. This activates the virtual translator 105. After the button is clicked, or the pre-determined number of combinations is dialed, the translation process starts with the SIP Gateway 103 creates audio files from the received voice streams and the previous caller's speech stored in the storage 110, and sends the created audio files to the virtual translator 105. A real-time connection (WebSocket, gRPC, etc.) is utilized for bidirectional communication between the SIP Gateway 103 and the virtual translator 105.

The virtual translator 105, when activated, utilizes a Voice Activity Detection (VAD) component 106 to recognize in the audio files when a person is speaking, allowing the virtual translator 105 to process only the necessary audio. If the agent turns down the sound volume of the caller's original voice, the VAD 106 is also used to notify if the caller is speaking via an indicator on the agent's screen. If the caller is speaking, the VAD detects it and notifies the agent so that the agent does not interrupt the caller.

The virtual translator 105 further employs a Speech Recognition (SR) and language detection component 107 to transcribe the spoken words into text in real time. In one embodiment, the Speech Recognition (SR) and language detection component 107 is a single component that can output both the transcribed text and the detected language. In another embodiment, the Speech Recognition (SR) and language detection component 107 comprises a Speech Recognition (SR) component and a separate Language Identifier component.

After processing the audio files with the Speech Recognition (SR) and language detection component 107, the transcribed text, the detected caller's language and the agent's language are then fed to the text translation component 108 which uses Machine Learning (ML) to perform multi-lingual translation. The transcribed text undergoes real-time translation where it is converted into the agent's language.

Next, the translated text is inputted to the Text-to-Speech (TTS) engine 109. Here, the translated text is synthesized back into audible speech in real time. Voice cloning technology is optionally present is this step for more human-like experience and easier detection of emotions.

Along with the transcribed and translated speech, the virtual translator 105 also captures emotional tones or sentiments from the caller's speech. The emotional tones or sentiments from the caller's speech and the transcribed and translated text are presented on the agent's screen by the virtual translator 105, wherein the translated speech stream is sent back to the SIP Gateway 103 from the virtual translator 105. In addition, the virtual translator further transmits directly to the agent 102 an indicator generated by the VAD 106 representing whether the caller 101 is currently speaking.

When the SIP Gateway 103 receives the translated speech, the SIP Gateway 103 streams the translated speech to the agent ("Call 2" as shown in FIGS. 3 and 4), such that the agent 102 simultaneously receives in real-time the translated speech from the SIP Gateway 103, as well as the emotional tones or sentiments from the caller's speech and the transcribed and translated text directly from the virtual translator 105.

After that, the agent 102 responds via speaking into a microphone of an agent's device, using the agent's own language different from the caller's language. The response made by the agent 102 is based on the translated speech received from the SIP Gateway 103, the emotional tones or sentiments from the caller's speech received from the virtual translator 105, the transcribed and translated text received from the virtual translator 105, and the indicator generated by the VAD 106, and is received from the virtual translator 105, representing whether the caller 101 is currently speaking.

The SIP Gateway 103 receives the agent's response and creates audio files in real-time based on the agent's response, and sends these audio files to the virtual translator 105.

To handle the audio files containing the agent's response, the VAD 106 detects when a person (i.e. the agent) is speaking, allowing the system to process only the necessary audio.

The Speech Recognition (SR) and language detection component 107 transcribes the agent's spoken words into text in real time. It is noted that at this point both caller's language and the agent's language have already been identified, and therefore the language detection function of the language detection component can be omitted when processing the audio files of the agent's response for the purpose of saving processing resource.

Similarly, the text translation component 108 utilizes Machine Learning (ML) to perform multi-lingual translations. The transcribed text undergoes real-time translation that converts the transcribed text of the agent's response from the agent's language into the caller's language.

The translated text is then transmitted to the Text-to-Speech (TTS) engine 109. The translated text is synthesized back into an audible speech in the caller's language in real time. Voice cloning technology is optionally present is this step for more human-like experience and easier detection of emotions.

After that, the translated speech stream is sent back to the SIP Gateway 103 by the virtual translator 105. In one embodiment, the translated speech stream of the agent's response is sent from the SIP Gateway 103 directly back to the caller 101, as shown in FIG. 3 "Call 1". In another embodiment, the translated speech stream of the agent's response is sent from the SIP Gateway 103 to the PBX 104, and then is routed back to the caller 101, as shown in FIG. 4 "Call 1".

The above process repeats during the communication session between caller 101 and the agent 102, allowing the caller 101 and the agent 102 to communicate in real-time with different languages. It is noted that when repeating the above process, the previous speech files stored in the storage 110 is omitted because these files have already been processed in the first round of translation.

A significant aspect of the disclosed automatic online voice translation system is its ability to facilitate direct communication between parties when they do not understand each other's language. In most instances, where language is not a barrier, the system functions as a straightforward communication channel, ensuring that the interaction remains as efficient and natural as possible. This feature underscores the system's adaptability and its emphasis on enhancing caller-agent interactions without unnecessary complications. Another feature of this invention is the agent-controlled translation activation. This allows call center agents to initiate the virtual translator at will, using a simple button click. This level of control is a significant departure from traditional systems, where translation services are either automatically triggered or rely on third-party translators. The ability for agents to decide when to engage the translation service based on the flow of the conversation offers a more tailored and efficient approach to handling multilingual interactions, ensuring that the translation is used effectively and at the most opportune moments.

A key innovation of this system is the elimination of the traditional language selection process commonly found in existing Interactive Voice Response (IVR) systems. In standard IVR setups, callers are often required to select a language by pressing a number, a process that can be cumbersome and time-consuming. However, with this invention, callers can directly converse in their preferred language without undergoing any additional selection steps. This feature is particularly advantageous in emergency situations, where time is of the essence, and immediate, barrier-free communication is crucial.

Another innovative aspect is the system's capability to store and translate parts of the conversation that occur before the activation of the virtual translator. In existing technologies, early parts of a conversation, often containing crucial information, are typically not captured for translation, leading to potential gaps in communication. This invention addresses this issue by ensuring that no part of the dialogue, regardless of when it occurs during the call, is missed. This comprehensive approach to conversation capture and translation is particularly valuable in maintaining the continuity and full context of caller interactions.

Moreover, the incorporation of a sentiment analysis feature represents a significant advancement over traditional translation systems. This feature allows agents to understand the emotional nuances of the caller's speech, an element often lost in conventional translation processes, especially those involving text-to-speech technologies. By providing agents with insights into the caller's emotional state, the system enables a more empathetic and effective communication approach, enhancing the overall quality of caller service.

The invention's another key new feature is the integration of a comprehensive real-time translation system within the Interactive Voice Response (IVR) framework. This integration enables instantaneous translation without external assistance, such as human interpreters and other electronic translators who join conversations as third parties. The system's ability to seamlessly operate within a contact center's existing telephony and IT infrastructure, particularly within a PBX system, demonstrates its versatility and adaptability. The invention extends beyond human-to-human translation, incorporating a human-to-machine translation aspect for existing IVR systems in Contact Centers. This functionality allows IVR systems to support a multitude of languages, as the invention can translate caller queries into the language supported by the IVR system and then translate the IVR's response back to the caller's language. This dual translation capability significantly broadens the linguistic reach of IVR systems, making them accessible to a wider range of callers and improving the overall efficiency of the contact center operations.

The integration of these features directly within the IVR system, rather than relying on external translation services, marks a significant innovation in this field. By embedding the translation capabilities directly into the existing telephony infrastructure, the invention streamlines the communication process, reduces potential delays, and enhances the overall coherence and effectiveness of multilingual interactions. This integrated approach reflects a significant leap forward in the technology of real-time voice translation, especially in the context of improving and optimizing multilingual caller service in call centers.

The aforementioned voice activity detection component, speech recognition and language detection component, text translation component, and text-to-speech engine are hardware components and engine, each includes a processor (CPU) and a memory (RAM, ROM, flash etc.). The memory stores computer readable instructions, which when being executed by the processor, cause the component to perform the functions as disclosed in the present disclosure.

In one embodiment, a specialized language translation software can be integrated into mobile devices or computer systems used by call center agents. This software would translate the spoken language in real-time, displaying the translated text on the agent's screen, allowing for a more dynamic interaction between the agent and the caller.

Advantages

The Real Time virtual translator and the integrated real-time voice translation system within Interactive Voice Response (IVR) systems have revolutionized call center operations, providing a suite of advantages that significantly enhance caller service communication.

One of the most significant features of these systems is their capacity for seamless and immediate communication. They effectively eliminate the need for cumbersome language selection menus in traditional IVR systems, which is especially crucial in emergency situations where quick and clear communication is vital. By enabling immediate conversation in the caller's preferred language, these systems dismantle linguistic barriers, making interactions more accessible and user-friendly.

In scenarios where both parties understand each other's language, the systems demonstrate intelligent adaptability. The Translator seamlessly steps back, allowing for a natural conversation flow without unnecessary translation. This feature is complemented by the agent-controlled translation activation, which gives call center agents the discretion to initiate the translation process as needed. The agent also has control in however they would like to use the TTS module. For example, the agent might only listen to the caller's original voice and use the virtual translator as just a transcribed text displayed on the screen, or it might adjust the volumes of the original voice of the caller and the voice produced by the TTS module. This flexibility ensures that translation is employed judiciously, enhancing communication efficiency and improving the overall caller experience by avoiding unnecessary interruptions.

The ability of these systems to store and subsequently translate parts of the conversation that occur before the activation of the virtual translator is another advantageous feature. This ensures that no critical information is lost, preserving the continuity and context of the interaction, a significant improvement over existing technologies where initial conversation segments often go untranslated.

The systems' expansion into human-to-machine translation broadens their application scope, equipping existing IVR systems to support multiple languages. This capability not only makes automated systems more inclusive but also enhances versatility by converting caller queries into the IVR-supported language and vice versa. The direct integration of these translation systems within the IVR infrastructure simplifies the translation process and reduces complexities associated with involving external third-party translators. This leads to more efficient call handling, shorter call durations, and an enhanced caller service experience.

In terms of technical accuracy, the systems boast high accuracy rates in speech recognition, ensuring effective and seamless interaction. The end-to-end speech recognition component is key to achieving accurate outputs, further elevating the system's effectiveness. Adding to their technological prowess, the integration of sentiment analysis represents a considerable advancement. This feature allows agents to discern the emotional tone of the caller's speech, fostering a more empathetic and effective response. It addresses the limitations of traditional text-to-speech technologies that often lose these emotional nuances, crucial for fully understanding the caller's state of mind.

Overall, the Real Time virtual translator and the real-time voice translation system within IVR systems not only address the linguistic needs in global communication but also enrich the caller experience. They make interactions more efficient, natural, and inclusive, establishing themselves as indispensable assets in modern caller service and support systems.

What is claimed is:

1. An automatic online voice translation system, comprising:

a virtual translator;

a Session Initiation Protocol (SIP) gateway; and a storage;

wherein the SIP gateway receives a call from a caller through a SIP trunk connection;

wherein the SIP gateway streams the caller's voice directly to an agent and streams the agent's voice directly to the caller when the virtual translator is not activated, without interruption of the voice stream;

wherein the SIP gateway continuously collects and stores, in the storage, a conversation segment of the caller prior to activation of the virtual translator;

wherein the virtual translator is selectively activated by the agent via clicking on a button or dialing a predetermined number of combinations;

wherein, upon activation, the SIP gateway creates audio files based on (i) received voice streams of both the caller and the agent and the stored conversation segment collected prior to activation, and sends the created audio files to the virtual translator for real-time speech recognition, language detection, text translation, and text-to-speech processing.

2. The automatic online voice translation system according to claim 1, wherein the virtual translator further comprises:

a voice activity detection component, wherein the voice activity detection component detects timings in the audio files in which there is a person speaking, allowing the virtual translator to process only corresponding portions of the audio files;

a speech recognition and language detection component, wherein the speech recognition and language detection component transcribes spoken words in the audio files into text in real time;

a text translation component, wherein the text translation component translates the transcribed text in caller's language into text in agent's language, and translates the transcribed text in the agent's language into text in caller's language; and a text-to-speech engine, wherein the text-to-speech engine synthesizes the translated text into a translated audible speech in real-time.

3. The automatic online voice translation system according to claim 2, wherein the virtual translator further captures emotional tones or sentiments from the caller's voice; the emotional tones or sentiments from the caller's voice and the translated transcribed text from the text translation component are transmitted directly from the virtual translator to the agent, and the translated audible speech from the text-to-speech engine is routed from the virtual translator to the agent through the SIP gateway, enabling the agent to simultaneously listen to the translated audible speech and view the emotional tones or sentiments from the caller's voice and the translated transcribed text.

4. The automatic online voice translation system according to claim 1, wherein the SIP gateway creates the audio files based on the received voice streams of both the caller and the agent and the speech of the caller stored in the storage.

5. The automatic online voice translation system according to claim 1, wherein a real-time connection of one of WebSocket or high performance remote procedure call (gRPC) for bidirectional communication is established between the SIP gateway and the virtual translator.

6. The automatic online voice translation system according to claim 1, wherein the virtual translator is activated by the agent via the agent clicking on a button or dialing a pre-determined number of combinations.

7. An automatic online voice translation system, comprising:

a virtual translator;

a contact center platform;

a Session Initiation Protocol (SIP) gateway; and a storage;

wherein the contact center platform receives a call from a caller and processes the call based on at least one of call recording, Interactive Voice Response (IVR) service, or conferencing service;

wherein the contact center platform routes the call to the SIP gateway for connection with an agent;

wherein the SIP gateway streams the caller's voice and the agent's voice, in real-time through the contact center platform when the virtual translator is not activated;

wherein the SIP gateway continuously collects and stores in the storage, a conversation segment of the caller before activation of the virtual translator;

wherein the virtual translator is activated by the agent via clicking on a button or dialing a pre-determined number of combinations:

wherein, upon activation, the SIP gateway creates audio files including both (i) real-time voice streams and ii) the stored conversation segment collected before activation, and transmits the audio files to the virtual translator for real-time speech recognition, language detection, text translation, and text-to-speech processing.

8. The automatic online voice translation system according to claim 7, wherein the virtual translator further comprises:

a voice activity detection component, wherein the voice activity detection component detects timings in the audio files in which there is a person speaking, allowing the virtual translator to process only corresponding portions of the audio files;

a speech recognition and language detection component, wherein the speech recognition and language detection component transcribes spoken words in the audio files into text in real time;

a text translation component, wherein the text translation component translates the transcribed text in caller's language into text in agent's language, and translates the transcribed text in the agent's language into text in caller's language; and a text-to-speech engine, wherein the text-to-speech engine synthesizes the translated text into a translated audible speech in real-time.

9. The automatic online voice translation system according to claim 8, wherein the virtual translator further captures emotional tones or sentiments from the caller's voice; the emotional tones or sentiments from the caller's voice and the translated transcribed text from the text translation component are transmitted directly from the virtual translator to the agent, and the translated audible speech from the text-to-speech engine is routed from the virtual translator to the agent through the SIP gateway, enabling the agent to simultaneously listen to the translated audible speech and view the emotional tones or sentiments from the caller's voice and the translated transcribed text.

10. The automatic online voice translation system according to claim 7, wherein the SIP gateway creates the audio files based on the received voice streams of both the caller and the agent and the speech of the caller stored in the storage.

11. The automatic online voice translation system according to claim 7, wherein a real-time connection of one of WebSocket or high performance remote procedure call (gRPC) for bidirectional communication is established between the SIP gateway and the virtual translator.

12. The automatic online voice translation system according to claim 7, wherein the virtual translator is activated by the agent via the agent clicking on a button or dialing a pre-determined number of combinations.

13. An automatic online voice translation method, comprising:

receiving, by a Session Initiation Protocol (SIP) gateway, a voice stream from a caller;

streaming the voice stream directly to an agent while a virtual translator is not activated;

continuously collecting and storing, in a storage, a conversation segment of the caller prior to activation of the virtual translator;

activating the virtual translator by the agent via clicking on a button or dialing a pre-determined number of combinations;

creating, by the SIP gateway, audio files including both the stored conversation segment and real-time voice streams;

transmitting the audio files to the virtual translator;

performing speech;

recognition, language detection, text translation, and text-to-speech synthesis in real time; and transmitting translated audible speech to the agent.

14. The automatic online voice translation method according to claim 13, further comprising:

receiving the spoken languages from a caller seeking service from an agent; and transmitting the second speech to the agent.

15. The automatic online voice translation method according to claim 14, further comprising:

activating the virtual translator the agent via the agent clicking on a button or dialing a pre-determined number of combinations.

16. The automatic online voice translation method according to claim 14, further comprising:

receiving, by the virtual translator, response voice streams from the agent;

converting the response voice streams from the agent to a second text;

translating the second text into a second translated text to a caller's language;

converting the second translated text to a third speech; and transmitting the third speech to the caller.

17. The automatic online voice translation method according to claim 14, further comprising:

capturing, by the virtual translator, emotional tones or sentiments from the caller's voice;

transmitting, by the virtual translator, an indicator indicating the emotional tones or sentiments from the caller's voice to the agent.

18. The automatic online voice translation method according to claim 14, further comprising:

receiving, by the agent, the indicator indicating the emotional tones or sentiments and the second speech simultaneously.

19. The automatic online voice translation method according to claim 14, wherein the transmitting of the second speech to the agent further comprising:

transmitting, by the virtual translator, the second speech to the SIP gateway; and transmitting, by the SIP gateway, the second speech to the agent.

20. The automatic online voice translation method according to claim 14, wherein the transmitting of the second speech to the agent further comprising:

transmitting, by the virtual translator, the second speech to the SIP gateway;

transmitting, by the SIP gateway, the second speech to a contact center platform; and transmitting, by the contact center platform, the second speech to the agent.

* * * * *